United States Patent [19]

Johnson

[11] Patent Number: 4,582,241
[45] Date of Patent: Apr. 15, 1986

[54] FORCE TRANSMITTING TOGGLE ASSEMBLY

[76] Inventor: Wallace E. Johnson, 9112 Spring Branch Dr., Houston, Tex. 77080

[21] Appl. No.: 373,964

[22] Filed: May 3, 1982

Related U.S. Application Data

[63] Continuation-in-part of Ser. No. 800,542, May 25, 1977, abandoned.

[51] Int. Cl.[4] .............................................. B23K 37/04
[52] U.S. Cl. .................................. 228/49.3; 269/48.1
[58] Field of Search ............... 228/44.5, 49.3; 269/43, 269/48.1, 228

[56] References Cited

U.S. PATENT DOCUMENTS

| | | | |
|---|---|---|---|
| 1,256,289 | 2/1918 | Bernhard | 74/520 X |
| 1,272,176 | 7/1918 | Alexandria | 269/228 X |
| 2,067,107 | 1/1937 | Tomkins | 269/228 X |
| 3,259,964 | 7/1966 | Engel | 228/49.3 |
| 3,681,560 | 8/1972 | Stanley | 228/49.3 |
| 3,699,635 | 10/1972 | Bradley et al. | 228/44.5 X |
| 3,979,041 | 9/1976 | Kaneyama et al. | 228/44.5 X |
| 4,253,599 | 3/1981 | Slavens | 228/49.3 |

FOREIGN PATENT DOCUMENTS 2201966  8/1972  Fed. Rep. of Germany ..... 228/49.3

Primary Examiner—Kenneth J. Ramsey
Attorney, Agent, or Firm—Carl B. Fox, Jr.

[57] ABSTRACT

A force transmitting toggle assembly having a plurality of toggle bars disposed between bar end engagement elements which provide a plurality of opposed bearing surfaces, the toggle bars being relatively movable in angular directions; the toggle bars having end engagement surfaces engageable with the opposed bearing surfaces, such that a force acting on one of the engagement elements is transmitted through the toggle bars to the other engagement elements.

6 Claims, 9 Drawing Figures

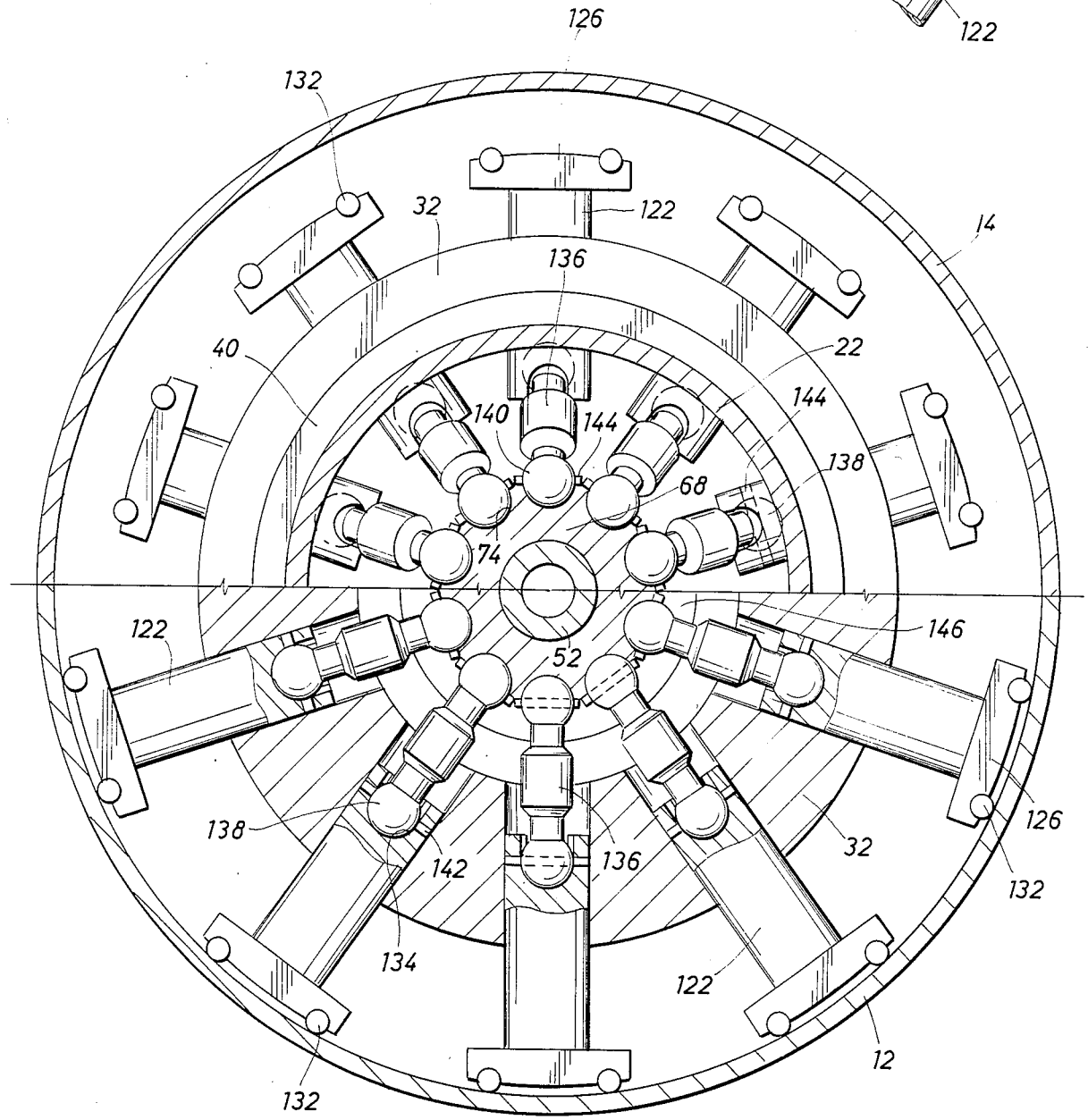

4,582,241

FORCE TRANSMITTING TOGGLE ASSEMBLY

This application is a continuation in-part of application Ser. No. 800,542, filed May 25, 1977, now abandoned.

BACKGROUND OF THE INVENTION

The present invention relates to force transmitting assemblies, and, more particularly, to such assemblies employing toggle bars as force transmitting elements.

There are numerous types of force delivering assemblies which utilize toggles for power transmission. Common among such assemblies are those which are used to exert radial forces between inner and outer objects. One example of such an apparatus is the apparatuses known as internal line-up or alignment clamps which are employed for aligning and holding in alignment adjacent sections of pipe while the pipes are being welded end-to-end. It is well known that pipe sections, particularly larger diameter pipes used in constructing oil and gas transmission lines, are generally out of round or eliptical, particularly at the ends. In order to insure that a proper weld is made between adjacent pipe sections, it is necessary that the abutting pipe ends be forced into alignment as nearly as possible. This pipe alignment is achieved by use of internal line-up clamps which exert a uniform outward force against the interior of the pipe wall. In order to force the pipe into a uniform circular configuration, the forces applied by the clamps must be quite large.

In the usual internal line-up clamps, a toggle linkage is employed between a central assembly and radially movable pipe engaging shoes. The central assembly is movable longitudinally with respect to the pipe while the shoes are movable radially. Thus the shoes can be expanded and retracted into and out of engagement with the walls of the pipe in response to longitudinal movement of the central assembly. Force applied to the central assembly is transmitted through the toggle bars to the shoes. Typical internal alignment clamps are shown in U.S. Pat. Nos. 1,779,649, 2,694,376, 2,906,226, 3,369,725, and 3,462,059. In all of the apparatuses of the above patents, the toggle links are connected by pins about which the toggle links pivot when the line-up clamp expands and retracts. U.S. Pat. No. 4,002,050 shows a force maintaining toggle system in which the toggle elements are pivotally connected by pivot pins or the like.

In all of the above patents, the toggle links are pivotally connected by pins. The pins form load bearing elements, and are in shear when the toggle system is used. Since the pins are the smallest part of the linkage, they are subject to failure as a result of the high shear forces thereon. This result becomes serious in the welding together of adjacent sections of pipe for oil and gas pipelines in that failure of the pins necessitates withdrawal of the clamp to replace the broken pin(s). Additionally, breakage of a pin may cause jamming of the clamp in the pipeline.

SUMMARY OF THE INVENTION

It is a principal object of the invention to provide an improved toggle assembly.

Another object of the invention is to provide a toggle assembly wherein the toggle bars are subjected to only compressive forces.

Still another object of the invention is to provide a toggle assembly which is not subjected to shear forces.

Yet another object of the invention is to provide a toggle assembly in an internal alignment clamp.

An important object of the invention is to provide an improved drive assembly for an internal alignment clamp.

A still further object of the invention is to provide an improved internal line-up clamp apparatus.

Other objects and advantages of the invention will appear from the following descriptions of preferred embodiments, reference being made to the accompanying drawings.

In one embodiment, the invention provides a toggle assembly wherein toggle bars are engaged between opposed bearing surfaces of a drive assembly and a driven assembly. A plurality of the toggle bars are disposed between bearing surfaces on the drive and driven assemblies, which are relatively movable in transverse directions. A force applied to the drive assembly in a direction acting to urge the toggle bars against the driven assembly causes movement of the driven assembly. Thus, the assembly provides a power transfer system in which all of the components are subject only to compressive forces rather than to shearing forces.

Another embodiment of the invention is in the form of an internal alignment clamp. The clamp includes a frame having means to support the frame for movement through a cylindrical pipe section. Means for propelling the frame through the pipe section are provided. A clamp assembly includes a drive member and a plurality of clamp shoes. Disposed between the drive member and the clamp shoes are a plurality of toggle bar members. The central member is movable axially of the pipe while the clamp shoes are movable radially. Application of forces to the drive member places the toggle bar members in compression causing radially outward movement of the clamp shoes to engage the pipe wall.

BRIEF DESCRIPTION OF THE DRAWINGS

FIG. 3 is a transverse cross section taken at line 3—3 of FIG. 2.

FIG. 5 is a vertical cross section of a modified clamping shoe according to the invention.

DESCRIPTION OF THE PREFERRED EMBODIMENTS

Figure 2:
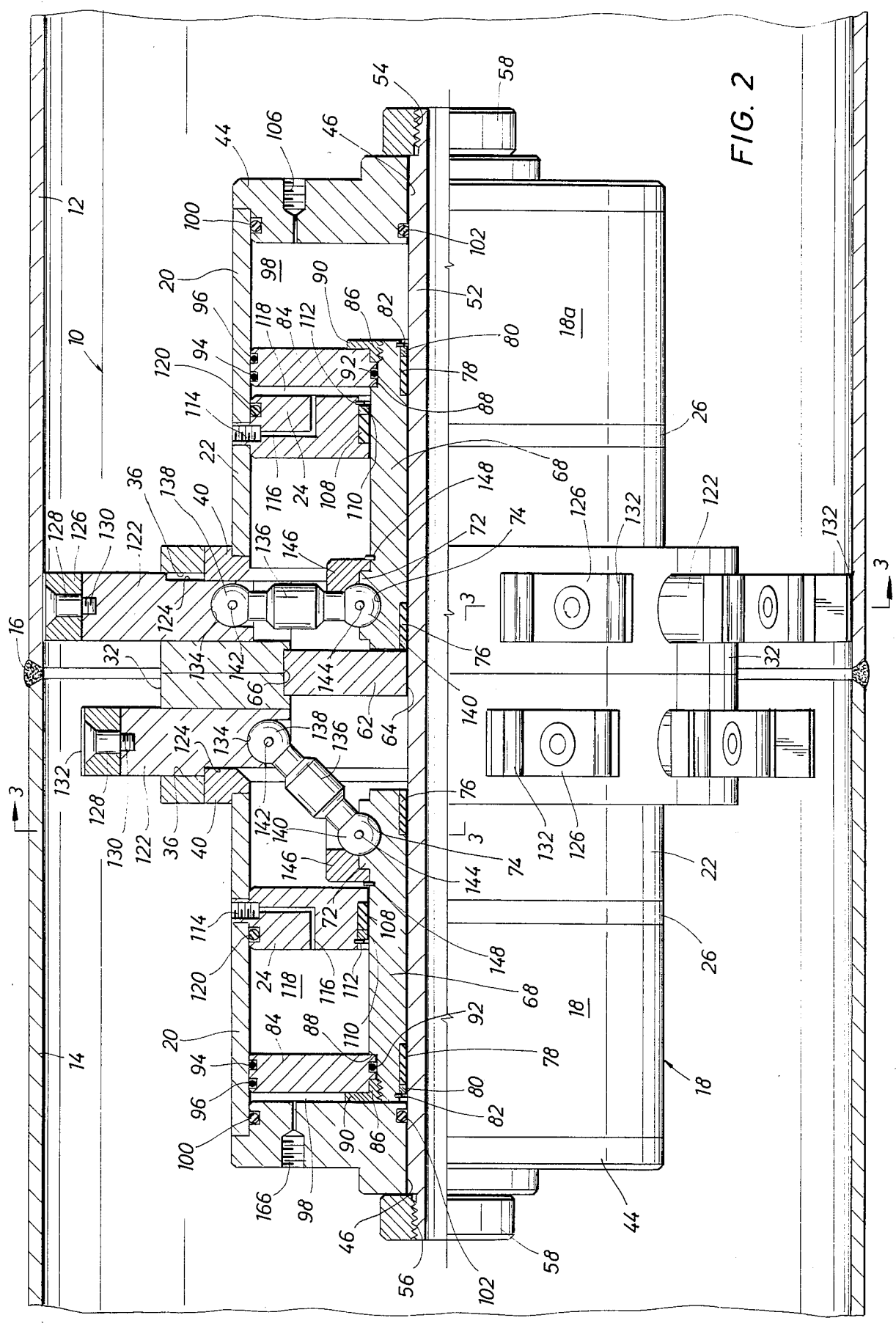
FIG. 2 is an enlarged side view, partly in section, showing the toggle assembly of the invention utilized in the drive assembly of an internal alignment clamp.

While the toggle assembly according to the invention will be described herein in connection with an internal alignment clamp, and more specifically a drive assembly for use therein, it is to be understood that it finds application in any system in which power transfer is desired employing a toggle-type linkage. Referring first to FIGS. 2 and 3, there is shown a clamp assembly of an internal line-up clamp according to the invention. The clamp assembly includes clamp shoes for engaging the walls of a pipe section and a suitable drive system for expanding and retracting the clamp shoes.

In the description, like parts of the two clamp assemblies are referred to by the same reference numerals. Only one of the clamping assemblies will be described, the other clamping assembly being of the same structure. In the drawings, the drive assembly 10 includes a housing 18 having two halves 18, 18a in each of which is disposed a clamp assembly. Housing half 18a has a cylindrical wall element 20 and a cylindrical wall element 22 disposed end-to-end. Ring 24 has a radially outwardly protruding flange 26, flange 26 being disposed between wall elements 20 and 22, as shown. Housing half 18a has a support ring 32 having a plurality of circularly spaced, radial bores 36. Spacing ring 40 is disposed around the inner end of wall element 22. A cover plate 44 having a centrally disposed circular hole 46 closes the outer end of wall element 20. A support shaft 52 extends axially through housing 18 projecting outwardly through the hole 46 in each end plate 44. While shaft 52 is shown as being tubular, it can be solid if desired. Shaft 52 has exterior threads at 54 and 56 to receive nuts 58. Disposed centrally of housing 18 is a disc-shaped center plate 62 having a central hole 64 through which shaft 52 is disposed. Plate 62 serves to support rings 32, the outer peripheral edge of plate 62 being received in an inwardly facing recess 66 formed by abutting rings 32. It will be apparent that when nuts 58 are tightened against end plates 44, end plates 44 will be urged toward one another whereupon housing halves 18a will be tightly held together to form housing 18.

Slidably disposed on shaft 52 is a drive sleeve 68. Sleeve 68 has an outwardly thickened portion 72 at the outer periphery of which are formed a plurality of circularly spaced seats 74, seats 74 each having a uniform, spherical shape. Sleeve 68 has bushings 76 and 78 therearound to slidably engage shaft 52. Annular seal 80 seals between shaft 52 and sleeve 68, being retained by snap ring 82. A piston 84 is secured around sleeve 68 by nut 86 screwed onto the end of sleeve 68. Piston 84 is clamped between shoulder 88 on sleeve 68 and radially extending flange 90 of nut 86. Seal 92 seals between piston 84 and sleeve 68. Seals 94, 96 seal between the periphery of piston 84 and wall element 20. A piston chamber 98 is formed between piston 84 and plate 44, seal 100 sealing between plate 44 and cylindrical wall element 20. Seal 102 seals between plate 44 and shaft 52. End plate 44 has port 106 therethrough through which pressured fluid can be delivered into chamber 98.

Bushing 108 permits sliding movement of sleeve 68 through ring 24. Seal 110 seals between ring 24 and sleeve 68, retained by snap ring 112. Port 114 is provided through flange 26 of plate 24, port 114 being in communication with passageway 116, passageway 116 opening chamber 118 formed between plate 24 and piston 84. Seal 120 seals between the periphery of plate 24 and wall element 20. By alternately pressurizing chambers 98 and 118, piston 84 and sleeve 68 can be reciprocated along shaft 52.

Each ring 32 has plural circularly spaced radial bores 36. Slidingly mounted in each bore 36 is a shaft 122. Shafts 122, which are cylindrical, each has a flat 124 which engages ring 40 to prevent rotations of the shaft 122. A clamp shoe 126 is fixed to the outer end of each plunger 122 by a bolt 128 received into a tapped bore 130 in the shaft 122. Clamp shoe 126 has transverse gripping rods 132 which are welded to shoe 126.

The inner end of each shaft 122 has a concave slot 134 of spherical shape. Toggle bars 136 each have spherically formed ends 138 and 140. When the toggle bars are under compressive force, each end 138 is engaged with a seat 134 and each end 140 is engaged with a seat 74. A retainer pin 142 extending through a bore in each toggle bar 136 serves to retain the toggle bar in shaft 122. A retainer pin 144 extending through a bore in toggle bar 136 is received in a recess 145 in protruding portion 72 of sleeve 68 and is held in recess 145 by a slotted, retainer ring 146 held against the protruding portion 72 of sleeve 68 by a snap ring 148, the slots in ring 146 registering with seats 74.

When sleeve 68 is moved longitudinally along shaft 52 by fluid pressure applied alternately to chambers 98 and 118, shafts 122 are radially expanded and retracted. The right half of FIG. 2 shows the clamp assembly with shafts 122 extended to engage shoes 126 with the wall of pipe section 12. The left half of FIG. 2 shows the clamp assembly with the shafts 122 retracted, the condition that the drive assembly would be in when being moved through the pipeline.

Figure 4:
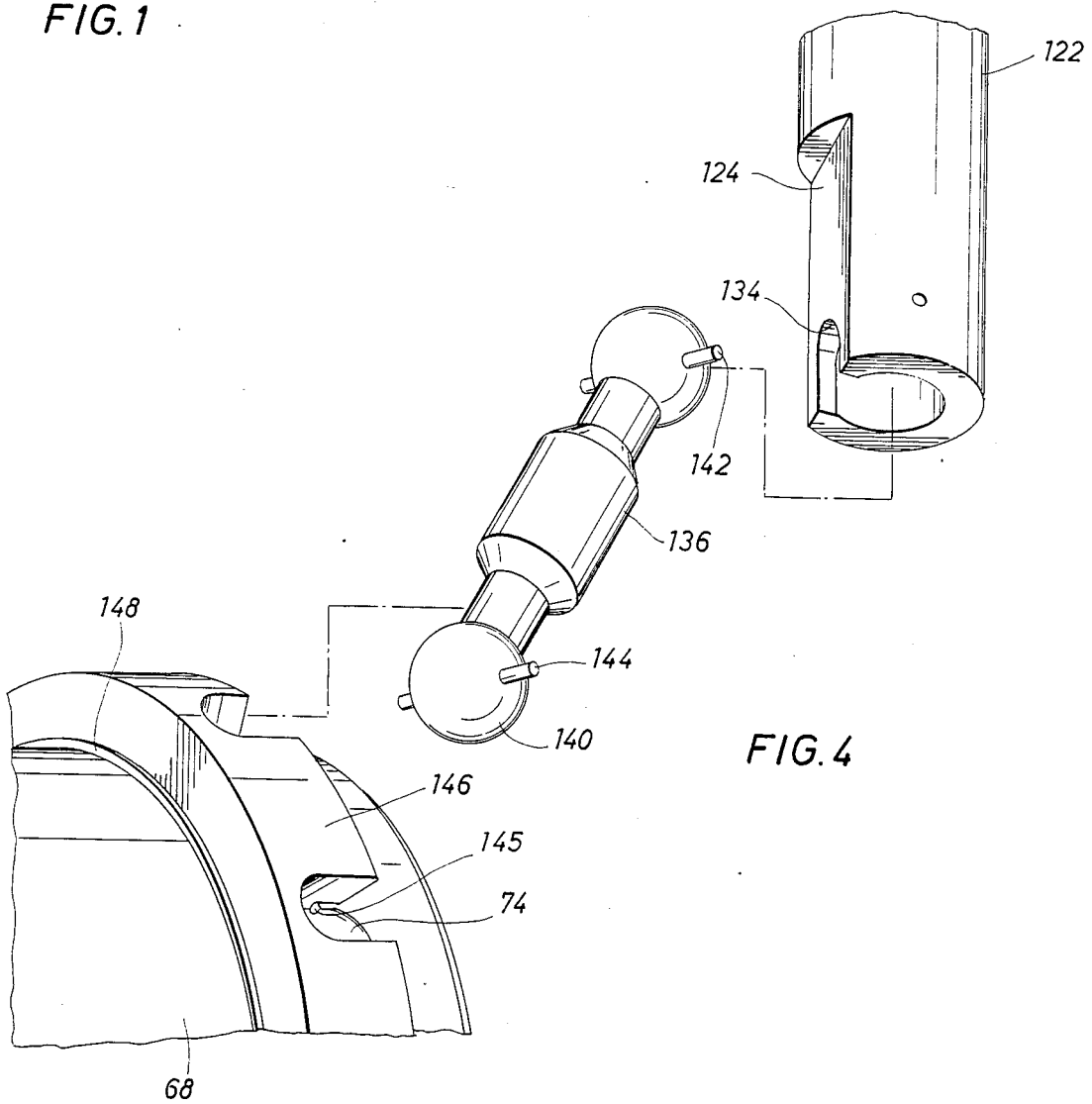
FIG. 4 is an exploded view showing the toggle assembly of FIGS. 2-4.

With reference to FIGS. 2, 3, and 4, the toggle bar assembly provides a power transfer system in which shearing forces are virtually eliminated. When a sleeve 68 is moved away from plate 44, seats 74 and 134 and bar ends 138 and 140 compressively engaged. The strong toggle bars 136 are in compression along their long axes between sleeves 68 and shafts 122. The pins 142 and 144 serve only as retainer pins and are not subjected to any shearing force when the shafts 122 are being radially extended to force the shoes against the pipe wall. This toggle bar design wherein bearing surfaces are compressively engaged provides a system in which minimum failure and wear occurs. As noted earlier, in prior art toggle systems, the toggle connection pins are subjected to severe shear stresses.

Figure 6:
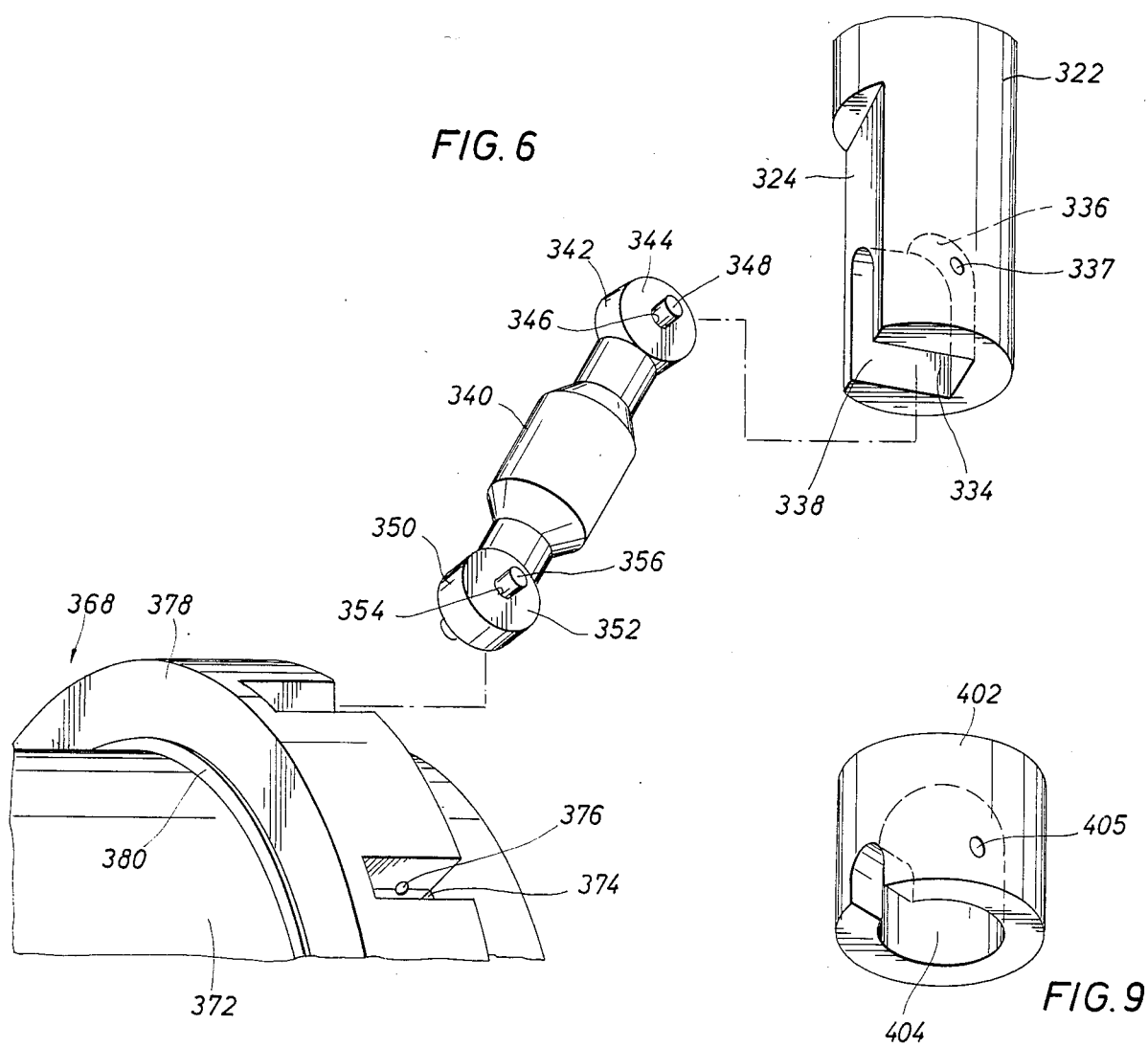
FIG. 6 is a view similar to FIG. 4 showing a modified embodiment of the toggle assembly according to the invention.

FIG. 6 shows another form of toggle bar assembly according to the invention, similar to that shown in FIG. 4 except that the bar ends are in the form of short cylinders. Shaft 322 has a flat 324 which engages spacer ring 40, FIG. 2. The inner end of each shaft 322 has a recess 334, having an arcuate surface 336 and opposite flat side walls, one of said side walls being referred to by reference numeral 338. Toggle bar 340 has cylindrical formation 342 at one end having side surfaces 344. A bore 346 is formed through cylinder 342 between the opposite end faces. When cylinder 342 is received in recess 334 with the arcuate end of cylinder 342 and arcuate surface 336 engaged, bores 346 and 337 are in register and a retaining pin 348 is inserted to retain toggle bar 340 engaged with shaft 342. Toggle bar 340 also has, at its other end, a cylindrical formation 350. Cylinder 350 is like cylinder 342 and has opposite end faces 352. A bore 354, extends through cylinder 350. The outward protrusion 372 of sleeve 368 has a plurality of circularly spaced seat recesses 374, which are similar to recesses 334 in shafts 322, having arcuate surfaces and flat side walls. A retainer pin 356 extending through bore 354 of toggle bar 340 is received in recess 376 in portion 372 of sleeve 368, and is held in recess 376 by slotted retainer ring 378 held against portion 372 of sleeve 368 by snap ring 380. As in the embodiment of FIG. 4, the assembly shown in FIG. 6 provides a power transfer system wherein there are no shear forces. The cylinders 342 and 350 on each toggle bar 340, and seat recesses 334 and 374 are complementarily shaped, and are in mutual compression when force is being transmitted through the toggle bars. The system shown in FIG. 6 has the advantage that, because the interengaged formations somewhat resemble a clevis connection or a tongue and groove connection, all relative rotation between the toggle bars and the shoe shafts, and between the toggle bars and the sleeves are precluded except for rotations about the axes of the cylinders.

Figure 1:
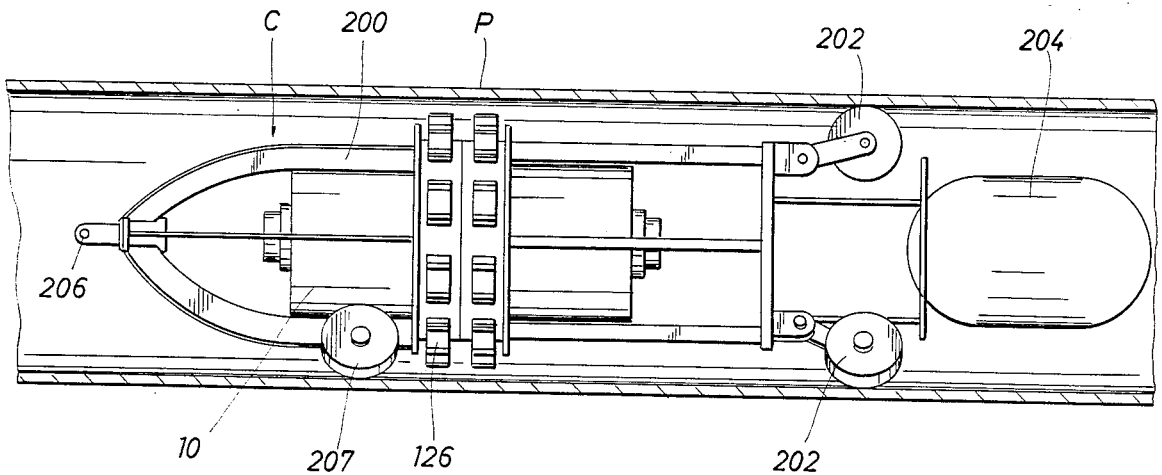
FIG. 1 is a side elevation, partly in vertical cross section, showing an internal alignment clamp utilizing the toggle system of the invention, disposed in a cylindrical pipe section.

FIG. 1 shows a simplified internal alignment clamp commonly used in the welding of pipelines for oil and gas transmission and incorporating the clamp assembly of the present invention. The clamp assembly C, shown in a pipeline P, has a frame 200 on which is mounted the drive assembly 10. The frame has wheels 202 to support the frame for movement through the pipeline P. A compressed air tank 204 is used to supply pneumatic power to the drive assembly 10 and can also be used, as known, to propel the internal alignment clamp C through the pipeline P. If desired, clamp C can be pulled through the pipeline P by attachment of a cable or the like to the frame 200 at eye 206. Since shaft 52 is tubular, electric cables and hoses may be disposed therethrough past the clamp apparatus, for any service required in the pipeline.

In FIG. 5 there is shown a modified form of clamp shoe for use in the clamp assembly of the invention. The modified clamp shoe has a plate 210 secured to shaft 122, having a recess 212 surrounded by a rim 214. Disposed in recess 212 is a gripping pad 216, pad 216 being made of a material such as asbestos, an asbestos containing composition, or some other like non-nettalic substance which possesses sufficient compressive strength to force the pipe wall into round and which will frictionally grip the pipe wall but which will not cut into the wall of the pipe or a coating thereon. Such a clamping shoe is particularly useful in pipe which is internally coated with an epoxy or other similar chemically inert coating. The gripping pad 216 can be secured in recess 212 by suitable adhesives or by other methods well known in the art. Gripping pad 216 replaces the gripping rods 132 of clamp shoes 126. Such gripping rods, being metallic, can damage the internal pipe coatings often used.

Figure 9:
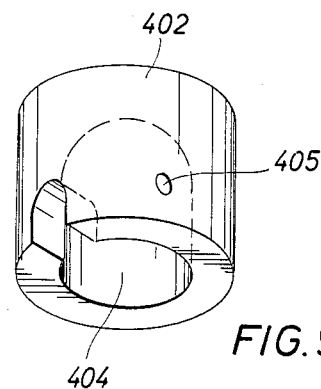
FIG. 9 is a perspective view showing a bearing insert according to a modified embodiment of the invention.
Figure 7:
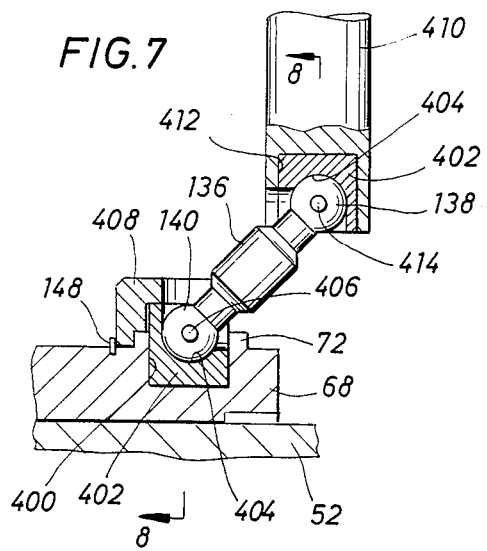
FIG. 7 is a side elevation, partly in vertical cross section, showing a modification of the toggle assembly of FIG. 2.
Figure 8:
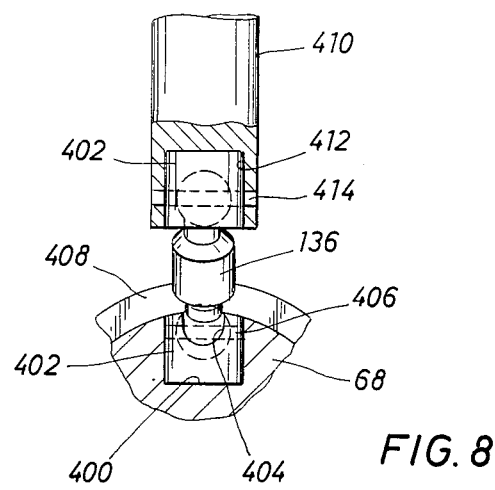
FIG. 8 is a vertical cross section taken at line 8—8 of FIG. 7.

FIGS. 7, 8 and 9 show a modification of the invention wherein the toggle bar end seats are formed in removable inserts which can be replaced if excessive wear occurs. Portion 72 of sleeve 68 has a plurality of circumferentially disposed, equally spaced, bores 400. Removably received in each bore 400 is a wear insert 402 having a seat 404 of spherical shape like sockets 74. A retainer pin 406 which extends through a bore 405 in insert 402 serves to hold toggle bar 136 in insert 402. A slotted retainer ring 408 held against the portion 72 of sleeve 68 by snap ring 148 maintains insert 402 in bore 400. Shoe shaft 410 has a bore 412, an insert 402 extends through registered bores in shaft 410, insert 402 and toggle bar 136 to hold the assembly together.

The use of inserts 402 provides several advantages. If the bearing surfaces wear excessively, it is not necessary to replace the complete shoe shafts or the sleeve, only the worn inserts. Another advantage lies in the fact that the entire apparatus can be made much lighter in weight. For example, the shoe shafts and the sleeves can be made of aluminum or some other lightweight material while the inserts are made of a highly wear resistant heavier material, such as hardened metals, tungsten carbide, etc. Additionally, by using inserts, the configurations of the seats can be varied. Thus, by switching the toggle bars and inserts, the assembly can be changed from one of the described forms to the other, and vice versa.

Because of the unique design of the toggle assembly of the present invention, compact yet efficient clamp assemblies employing same can be easily made for use with small diameter pipes. It is well known that, for a given wall thickness, the force required to straighten pipes varies generally inversely with the diameter of the pipe. Thus, it becomes virtually impossible to design clamp assemblies using conventional toggle links for use in small diameter pipe. The high forces necessary to straighten small diameter pipe, e.g. below 8 inches O.D., require that the pivot pins in such prior art toggle assemblies be relatively large to withstand the high shearing loads. However, because of the small size, the pins cannot be made large enough to withstand the shearing loads. Any compromise design which takes into account size limitations and pivot pins which will withstand the high shearing forces imposed results in a clamp assembly which is subject to frequent failure.

The centers of the toggle bar ends slide along arcuate paths as the toggle bars move between their extreme positions shown at the lefthand and righthand parts of FIG. 2, and also respectively shown at the upper and lower parts of FIG. 3. Thus, the centers of the toggle bar ends are off-center with respect to the seats when the least compressive force prevails, and are centered with respect to the seats when the most compressive force prevails and when the greatest apparatus strength is required as high force is applied to the pipe wall by the clamp shoes. The toggle bars move about 45° between their said extreme positions.

The toggle members and the respective engagement means disposed at the ends of the toggle members must have engageable formations which can be projecting as to the toggles and receiving as to the engagement means or vice versa. It is only necessary that the toggle member have engagement surfaces at its respective ends which are in engagement with bearing surfaces such that when a force is transmitted through the toggle members, the engagement surfaces on the ends of the toggle and the bearing surfaces are compressively urged together and force transmission occurs in the absence of any substantial shearing forces. Accordingly, the engagement and bearing surfaces, all acting as bearing surfaces in compression, should be configured to permit smooth, relative movement of the parts of the toggle linkage.

The force transmitting toggle assembly of the invention finds usage not only in internal alignment clamps, but in many other applications as well. For example, the assembly can be used in internal automatic welding systems, pipe bending mandrels and other such expandable and retractable mandrels. It will also be apparent that the assembly can be used for externally clamping a workpiece. Thus, for example, with reference to FIG. 2, the shafts could be replaced by an annular support member such as a sleeve and the sleeve in turn replaced by individual gripping elements or shoes which could be used to clamp the external surface of a workpiece located at the center of the assembly. It will also be appreciated that the toggle assembly is not limited to a system for clamping cylindrical workpieces.

While preferred embodiments of the invention have been described and shown in the drawings, many modifications thereof may be made by a person skilled in the art without departing from the spirit of the invention, and it is intended to protect by Letters Patent all forms of the invention falling within the scope of the following claims.

I claim:

1. Internal line up clamp apparatus for clamping pipe ends together in alignment for welding, comprising a circular center plate, a central axial shaft disposed through a circular hole through said center plate and extending equal distances from each side of said center plate, said shaft having external threads around each of its ends and having a smooth uniform cylindrical exterior therebetween, a sleeve slidably disposed about said shaft at each side of said center plate, a piston sealedly fixed around the outer end of each said sleeve, a pair of support rings disposed flushly together and supported around the periphery of said center plate, cylindrical wall means spaced concentrically around said shaft at each side of said center plate and engaged at their inner ends with said support rings, an end plate closing the outer end of each said cylindrical wall means and each having a hole therethrough through which said shaft is sealedly disposed, a nut means screwed onto said exterior threads at each end of said shaft and against said end plate to hold said support rings, cylindrical wall means and end plates together as a housing having a separate chamber at each side of said center plate, a wall plate slidably sealed around said sleeve and sealed to said cylindrical wall to separate each said separate chamber into two parts with said piston in one part and the inner end of said sleeve in the other part, pressured fluid flow passages from the housing exterior communicating with said one chamber part at each side of said piston therein whereby said piston and sleeve may be driven by fluid pressure in either direction along said shaft, plural equally circularly spaced radial bores through each said support ring, the same plurality of pipe wall engaging shoes each having an inwardly extending shaft closely slidably received through one of said radial bores, the same plurality of bars each engaged with the inner end of a said sleeve and with one of said inwardly extending shafts so that when the sleeve is driven toward said center plate along said shaft by fluid pressure said bars drive said inwardly extending shafts and the shoes thereof outwardly into clamping engagement with the interior of a pipe within which said apparatus is disposed.

2. The combination of claim 1, including a ring flat at its side facing a said support ring disposed clamped between a said support ring and the inner end of one of said cylindrical wall means, each said inwardly extending shaft having a flat slidable along a said ring flat whereby said inwardly extending shafts are restrained against rotation in said bores.

3. The combination of claim 2, each of said bars having a convex form at each of its ends, each of said inwardly extending shafts having a concave form at its inner end and each said sleeve having the same plurality of said concave form therearound, whereby each said bar has a said convex end engaged in a said concave form of a said inwardly extending shaft and a said convex end engaged in a said concave form of a said sleeve, and means for retaining each said convex bar end in said concave form in which it is engaged.

4. The combination of claim 3, wherein said convex bar ends are spherical and said forms are spherically concave.

5. The combination of claim 3, wherein said convex bar ends are of short cylindrical shape with the cylindrical axes transverse to the bar length, and said forms are of corresponding concave shape.

6. The combination of claim 3, wherein each said cylindrical wall means is formed by two end to end cylindrical wall lengths, and wherein each said wall plate has an outwardly formed flange therearound disposed between said two end to end cylindrical wall lengths.

* * * * *